(12) United States Patent
Ziegenhagen et al.

(10) Patent No.: US 10,974,172 B2
(45) Date of Patent: Apr. 13, 2021

(54) METHOD FOR THE DEGASSING OF HYPERGOLIC PROPELLANTS

(71) Applicant: ArianeGroup GmbH, Taufkirchen (DE)

(72) Inventors: Stefan Ziegenhagen, Bammental (DE); Ewald Scharli Weinert, Hardthausen (DE); Volker Groebel, Weingarten (DE)

(73) Assignee: ArianeGroup GmbH, Taufkirchen (DE)

( * ) Notice: Subject to any disclaimer, the term of this patent is extended or adjusted under 35 U.S.C. 154(b) by 242 days.

(21) Appl. No.: 15/894,738

(22) Filed: Feb. 12, 2018

(65) Prior Publication Data

US 2018/0229154 A1    Aug. 16, 2018

(30) Foreign Application Priority Data

Feb. 13, 2017    (DE) .................... 10 2017 202 207.8

(51) Int. Cl.
*B01D 19/00*    (2006.01)
*C06D 5/08*    (2006.01)
*C06B 21/00*    (2006.01)

(52) U.S. Cl.
CPC ...... *B01D 19/0036* (2013.01); *C06B 21/0091* (2013.01); *C06D 5/08* (2013.01); *B01D 19/00* (2013.01)

(58) Field of Classification Search
CPC .. B01D 19/0036; B01D 19/00; C06B 21/091; C06D 5/08
See application file for complete search history.

(56) References Cited

U.S. PATENT DOCUMENTS

| | | | | |
|---|---|---|---|---|
| 3,769,389 | A * | 10/1973 | Paustian | C01B 21/16 423/386 |
| 4,001,057 | A * | 1/1977 | Baldwin | C06B 33/02 149/19.3 |
| 5,433,802 | A * | 7/1995 | Rothgery | C06B 47/08 149/109.6 |
| 6,210,504 | B1 | 4/2001 | Thompson | |
| 2005/0002291 | A1 * | 1/2005 | Takeuchi | G11B 5/59605 369/44.29 |
| 2007/0245750 | A1 * | 10/2007 | Elliott | C06B 47/04 62/54.1 |
| 2009/0031700 | A1 * | 2/2009 | Karabeyoglu | C10L 1/12 60/205 |
| 2017/0369315 | A1 * | 12/2017 | Alvarez, Jr. | H01P 3/081 |
| 2018/0008909 | A1 * | 1/2018 | Barkel | A01C 7/201 |
| 2018/0366754 | A1 * | 12/2018 | Yamamoto | C08J 5/2231 |

OTHER PUBLICATIONS

German Office Action issued in German counterpart application No. 10 2017 202 207.8 dated Oct. 17, 2017 (Three (3) pages).

* cited by examiner

*Primary Examiner* — Edward F Landrum
*Assistant Examiner* — Alexis K Cox
(74) *Attorney, Agent, or Firm* — Crowell & Moring LLP

(57) ABSTRACT

A method for the degassing of hypergolic propellants includes introducing hypergolic propellant into a vacuum-tight vessel, cooling the vacuum-tight vessel containing the hypergolic propellant, and applying a pressure that is reduced as compared to the atmospheric pressure to the hypergolic propellant.

7 Claims, 1 Drawing Sheet

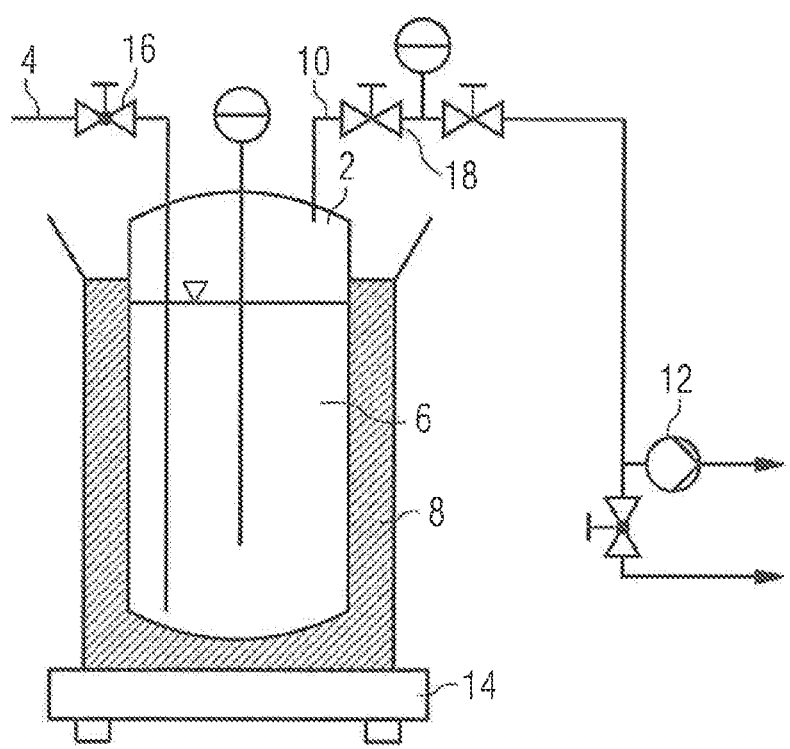

METHOD FOR THE DEGASSING OF HYPERGOLIC PROPELLANTS

CROSS REFERENCE TO RELATED APPLICATIONS

This application claims priority under 35 U.S.C. § 119 to German Patent Application No. 10 2017 202 207.8, filed Feb. 13, 2017, the entire disclosure of which is herein expressly incorporated by reference.

BACKGROUND AND SUMMARY OF THE INVENTION

The invention relates to a method for the degassing of hypergolic propellants. The invention further relates to degassed hypergolic propellants, which are substantially free of inert gases, and vacuum-tight vessels, which contain these degassed hypergolic propellants.

The present invention relates to the degassing or desaturation of hypergolic propellants in order to obtain hypergolic propellant that is as gas-free as possible.

Hypergolicity is a property of certain propellants, the components of which react spontaneously with one another when they are brought into contact or mixed. The components of hypergolic propellants are usually strong oxidising and reduction agents, which ignite immediately upon contact, sometimes explosively. Hypergolic propellants (e.g. hydrazine derivatives and dinitrogen tetroxide) can be stored for a long time without cooling (unlike e.g. liquid hydrogen) and are therefore used by satellites and space probes or in upper stages of rockets. Manned spacecraft also use them e.g. for their thrusters.

Since the propellant reacts immediately and combusts following injection into the combustion chamber, too much propellant must never be allowed to collect in the combustion chamber before the engine is ignited. Hypergolic propellants are also used in some engines for ignition. Engines that burn hypergolic propellants do not need any complicated ignition devices and can ignite repeatedly. Hypergolic propellants are therefore often used, as described above, in thrusters, as these have to be ignited frequently and the number of ignitions is not always set beforehand.

When hypergolic propellants are spoken of in the present application, both the individual components (e.g. dimethylhydrazine alone) and their combinations (e.g. dimethylhydrazine and dinitrogen tetroxide) are understood by these. However, the degassing described herein should take place with individual isolated components, as the combinations, as described earlier above, are highly flammable. The reduction agents hydrazine and its hydrazine derivatives, such as in particular 1,1-dimethylhydrazine (or unsymmetrical dimethylhydrazine, UDMH) and monomethylhydrazine (MMH), and oxidising agents, such as in particular dinitrogen tetroxide (NTO, $N_2O_4$), are accordingly hypergolic propellants among others.

Hypergolic propellants contain inert gases such as nitrogen and helium, which are used during production, transportation or storage to prevent an undesirable reaction of the hypergolic propellant. Thus nitrogen, for example, is used in the production of hypergolic propellants and therefore collects in it. Furthermore, nitrogen is an inexpensive inert gas and is therefore used for the hazard-free transportation of hypergolic propellants. Helium is a very light inert gas and is therefore added to hypergolic propellants to make their transport for space missions cost-efficient and safe.

The solubility-pressure ratio of helium and nitrogen in hypergolic propellants is determined by Henry's law according to the formula $X=K \cdot P$, wherein X represents the mole fraction of dissolved gas, P the partial pressure and K the solubility constant. The gas solubility of gases such as nitrogen and helium in liquid hypergolic propellants accordingly increases as a function of the temperature. Hypergolic propellants are normally stored under high pressure, such as e.g. at 4 bar, in a helium or nitrogen atmosphere, wherein the liquid hypergolic propellants are saturated with these gases. Hypergolic propellants are therefore saturated with inert gases, i.e. they contain a concentration of inert gases like nitrogen and helium corresponding to the pressure and temperature.

The heat transfer properties of such gas-saturated liquids differ significantly from those of pure liquids, as dissolved gas bubbles can prevent heat transfer, lead to thrust anomalies of the rocket engines operated and even cause a burnout of the walls of the rocket chamber, among other things. Gas bubbles can also make hydrazine and hydrazine derivatives more sensitive, which increases the risk of explosions in adiabatic compression.

Gases accordingly influence the performance and safety of hypergolic propellants.

To avoid the formation of bubbles in the supply system, the gas content in the propellant should preferably amount to as little helium and nitrogen as possible.

It should be noted that a reproducible saturation of hypergolic propellants with helium and nitrogen is difficult to achieve, i.e. even if saturated hypergolic propellants are used, their reproducible use cannot be ensured.

Previously known methods are based on the exclusive expulsion of gas components by so-called "stripping". In this, a flow by a certain gas of lower solubility, such as e.g. helium, through the liquid phase takes place, which gas takes up the other dissolved gases, such as nitrogen in particular, by desorption according to Henry (concentration equilibrium) and conveys them out of the liquid phase.

As compared to this method, the efficiency is to be increased on the one hand, as all residual gases can be removed, and on the other hand the vapour losses of the liquid phase are to be kept low, as no valuable hypergolic propellant is removed. Furthermore, it is advantageous that no gas possibly used in other processes remains in the liquid phase.

A completely or at least substantially degassed hypergolic propellant is thus provided by the method claimed.

The invention is directed towards the object of providing a method for the degassing of hypergolic propellants. Furthermore, the invention is directed towards the object of providing hypergolic propellants degassed according to such a method, and a vacuum-tight vessel, which contains the degassed hypergolic propellants.

This object is achieved by a particular method according to the invention, as well as a particular degassed hypergolic propellant and a particular vacuum-tight vessel.

Hypergolic Propellants

Hypergolic propellants are strong oxidising and reduction agents, which ignite immediately, sometimes explosively, upon contact. Examples of hypergolic propellants that are used are dimethylhydrazine and dinitrogen tetroxide, methylhydrazine and dinitrogen tetroxide, dimethylhydrazine and nitric acid, hydrazine and nitric acid, aniline and nitric acid, hydrogen peroxide and a mixture of hydrazine hydrate, methanol and 13% water, highly concentrated hydrogen peroxide and RP-1 (so-called Rocket Propellant 1).

When hypergolic propellants are spoken of in the present application, both the individual components (e.g. dimethylhydrazine alone) and their combinations (e.g. dimethylhydrazine and dinitrogen tetroxide) are understood by these. However, the degassing described herein should normally take place with individual isolated components, as the combinations, as described earlier above, are highly flammable.

Preferably used and thus degassed hypergolic propellants are 1,1-dimethylhydrazine (or unsymmetrical dimethylhydrazine, UDMH), monomethylhydrazine (MMH), hydrazine and dinitrogen tetroxide (NTO, $N_2O_4$).

1,1-dimethylhydrazine (UDMH) is a colourless liquid with an amine odour and melting point of $-58°$ C., a boiling point of $63°$ C. and a vapour pressure of 164 hPa ($20°$ C.). Methylhydrazine (MMH) is a colourless, hygroscopic liquid with an ammoniacal odour and with a melting point of $-52°$ C., a boiling point of $87°$ C. and a vapour pressure of 50 hPa ($20°$ C.). Hydrazine is a colourless, clear liquid with a melting point of $1.54°$ C., a boiling point of $113.5°$ C. and a vapour pressure of 21 hPa ($20°$ C.). Dinitrogen tetroxide (NTO, $N_2O_4$) is a colourless gas that turns reddish brown on heating, with a pungent odour and with a melting point of $-11°$ C., a boiling point of $21°$ C. and a vapour pressure of 0.1 MPa ($20°$ C.). Since hypergolic propellants in liquid form are being degassed in the present invention, the dinitrogen tetroxide must be cooled if necessary to below the boiling point at $21°$ C. to be present in liquid form.

Due to their high reactivity, hypergolic propellants are produced, supplied and stored in an inert gas atmosphere. Inert gases of this kind are primarily nitrogen, helium and argon, wherein nitrogen is used primarily on account of its low price and helium on account of its low weight for space missions. The hypergolic propellants therefore normally contain a gas, in particular an inert gas, which comprises nitrogen, helium or argon.

These inert gases and if applicable other foreign gases collect in the hypergolic propellants, i.e. the hypergolic propellants are saturated with the inert and any foreign gases. If gases, or inert gases, are spoken of here, other foreign gases may also be included.

The degassed hypergolic propellants described herein preferably contain no or only few inert gases. The degassed hypergolic propellants preferably contain between 0 and 100 mg/l, preferably between 0 and 50 mg/l, more preferably between 0 and 10 mg/l and most preferably between 0 and 5 mg/l of inert gases. A hypergolic propellant that is substantially free of dissolved inert gases accordingly contains preferably 0 to 100 mg/l, 0 to 50 mg/l, 0 to 10 mg/l, or 0 to 5 mg/l of inert gas.

Device for Degassing Hypergolic Propellants

A device for degassing hypergolic propellants comprises a vacuum-tight vessel, an inlet line for the introduction of hypergolic propellant into the vacuum-tight vessel, a tempering unit for cooling the vacuum-tight vessel containing the hypergolic propellant and a negative pressure source connected via an outlet line 10 to the vacuum-tight vessel, which source is configured to generate a reduced pressure in the vacuum-tight vessel as compared to atmospheric pressure.

The hypergolic propellant can be selected from at least one of 1,1-dimethylhydrazine, monomethylhydrazine, hydrazine and nitrogen tetroxide and the hypergolic propellant can contain a gas, which comprises at least helium, nitrogen or argon.

The vacuum-tight vessel is provided with an inlet line and an outlet line. The vacuum-tight vessel can be filled with hypergolic propellant via the inlet line. The hypergolic propellant should be present in liquid form here, i.e. in the case of nitrogen tetroxide this must be cooled if necessary before filling.

The vacuum-tight vessel with the hypergolic propellant is cooled by a tempering unit. The tempering unit preferably comprises a cooling vessel, via which the vacuum-tight vessel is cooled. The cooling vessel is preferably filled with dry ice, so that the vacuum-tight vessel is cooled to a temperature of approx. $-78°$ C. When the hypergolic propellant is cooled using dry ice, the substance-specific freezing temperatures can be reached easily.

Dry ice also has a high thermal/refrigeration capacity, which is beneficial for the economy and efficiency of the method using the device. Furthermore, the method is virtually location-independent, as the device can be constructed in principle anywhere that the handling of hypergolic propellants is permitted.

During the process as a whole, care should be taken that the hypergolic propellant does not come into contact with air or oxygen, but is always handled in an inert gas atmosphere or in a vacuum. A "reduced pressure", or an "underpressure", or a "negative pressure", or a "vacuum" is understood here as a pressure that is reduced as compared to atmospheric pressure. The negative pressure source can comprise a vacuum pump, for example, which is configured to generate a pressure that is reduced as compared to atmospheric pressure.

The pressure in the vessel following degassing corresponds to that of the vapour pressure of the liquid at the corresponding temperature. Since this is normally below the ambient air pressure (approx. 1 bar), the vessel should have a high pressure resistance and a high vacuum tightness, in order to guarantee a long storage time of e.g. 1 year. This applies in particular to the storage of NTO, which can assume vapour pressures of between 200 mbar and several bar depending on temperature.

As soon as the hypergolic propellant is cooled, but before its freezing point is reached, where it is present in solid form, negative pressure can be applied to the hypergolic propellant via a negative pressure source connected to the outlet line. The negative pressure source is preferably a vacuum pump, such as, in particular, a chemically compatible membrane vacuum pump. Due to the strong cooling of the propellants and the reduction in vapour pressure or sublimation pressure associated with this, the required vacuum capacity is relatively low. The negative pressure source is therefore preferably configured to remove inert gases from hypergolic propellants. The negative pressure source is therefore preferably configured to apply a vacuum of 1 to 100 mbar, preferably of 1 to 50 mbar, preferably of 1 to 20 mbar, more preferably of 1 to 10 mbar and most preferably of 1 to 2 mbar to the hypergolic propellant.

The device for degassing hypergolic propellants preferably comprises a shaking apparatus for the mechanical movement of the vacuum-tight vessel. The device can be shaken by this shaking apparatus during the entire process, which aids the degassing or desaturation. The separation of gas and liquid hypergolic propellant is assisted by constant mechanical movement of the liquid during the cooling and vacuum process. The mechanical movement is preferably achieved by placing the device on a vibrating table, which preferably shakes at a frequency of 20 to 30 Hz.

The device for degassing hypergolic propellants can further comprise valves arranged on the inlet line and the outlet line for tight closure of the vacuum-tight vessel. The valves facilitate the controlled supply of hypergolic propellant, the removal of inert gases, and the tight closure of the vacuum-tight vessel after the procedure.

The device for the degassing of hypergolic propellants can further comprise a temperature sensor, which is arranged in the vacuum-tight vessel. The temperature in the vacuum-tight vessel can be monitored on an ongoing basis via the temperature sensor. A reduced pressure as compared to the atmospheric pressure (a vacuum) can thereby be applied to the hypergolic propellant at the desired time, which is preferably selected as described herein, e.g. while the hypergolic propellant is present in an already cooled, but still liquid form.

Method for Degassing Hypergolic Propellants

A method for degassing hypergolic propellants comprises introducing hypergolic propellant into a vacuum-tight vessel, cooling the vacuum-tight vessel containing the hypergolic propellant, and applying a reduced pressure as compared to the atmospheric pressure to the hypergolic propellant.

The hypergolic propellant can be selected from at least one of 1,1-dimethylhydrazine, monomethylhydrazine, hydrazine and nitrogen tetroxide. The hypergolic propellant can contain a gas, which comprises at least helium, nitrogen or argon.

The core of the method is based on the gas solution behaviour in liquids, which is highly dependent on the temperature and the pressure. The principle of the method is based on the fact that dissolved gas is removed from the hypergolic propellant by a liquid-solid phase transition by means of freezing. During the slow, time-controlled freezing process, the dissolved gas is constantly aspirated by continuous application of negative pressure (a vacuum, or a reduced or negative pressure) by means of a negative pressure source to the gas space over the liquid volume.

The hypergolic propellant is preferably introduced at roughly room temperature, e.g. from 5° C. to 35° C., preferably from 10° C. to 30° C., preferably from 15° C. to 25° C., more preferably at around 22° C. into the vacuum-tight vessel. The hypergolic propellant is cooled from this temperature to the freezing point of the hypergolic propellant. During the cooling, a reduced pressure as compared to the atmospheric pressure is simultaneously applied to the hypergolic propellant, in order to remove inert gases contained therein.

The reduced pressure as compared to the atmospheric pressure is preferably applied to the already cooled, but still liquid, hypergolic propellant. The reduced pressure as compared to the atmospheric pressure is accordingly applied at least temporarily during the cooling. The reduced pressure as compared to the atmospheric pressure is preferably applied (i.e. started) during the cooling process on reaching a temperature of −10° C. to 10° C., more preferably from −5° C. to 5° C., most preferably at around 0° C. and maintained over at least a portion of the cooling.

The reduced pressure as compared to the atmospheric pressure is preferably maintained until the freezing point of the hypergolic propellant is reached. The reduced pressure as compared to the atmospheric pressure is preferably applied accordingly during the cooling process, while the hypergolic propellant is cooled but still in liquid form. The reduced pressure as compared to the atmospheric pressure is preferably maintained until the melting point of the hypergolic propellant is reached, i.e. until the hypergolic propellant is present in solid form.

If the hypergolic propellant is present already cooled when the reduced pressure as compared to the atmospheric pressure is applied, its vapour pressure is reduced, so that little to no hypergolic propellant is aspirated via the negative pressure source. If the negative pressure were only applied when the freezing point was reached, on the other hand, the gases could be trapped in the crystal matrix of the frozen hypergolic propellant, so that they could then no longer be removed.

In the case of hypergolic propellants that are present in liquid form at room temperature (approx. 22° C.) (e.g. UDMH with a boiling point of 63° C.), cooling takes place initially, for example, from room temperature to 0° C., then the negative pressure source is turned on and a pressure that is reduced as compared to the atmospheric pressure is applied until the hypergolic propellant freezes (e.g. for UDMH at a melting point of −58° C.). In the temperature range between 0° C. and the freezing point (at UDMH −58° C.), inert gases dissolved in the hypergolic propellant are removed, while scarcely any of the hypergolic propellant itself is removed.

In the case of pure liquid hypergolic propellants, such as UDMH, MMH and hydrazine in particular, which have a boiling point at over 60° C. (e.g. UDMH with a boiling point of 63° C.), the cooling of the liquid phase to freezing point causes a drop in the vapour pressure to virtually 0 mbar. Due to this, the dissolved gases can be removed up to the concentration corresponding to this pressure level due to the negative pressure present that is reduced as compared to the atmospheric pressure.

In hypergolic propellants that are present in gaseous form at room temperature (approx. 22° C.) (e.g. in the case of NTO with a boiling point of 21° C.), these are first slightly cooled if necessary until they are present in liquid form and then they are cooled from this temperature initially to 0° C., then the negative pressure source is turned on and a pressure that is reduced as compared to the atmospheric pressure is applied until the hypergolic propellant freezes (e.g. in the case of NTO at a melting point of −11° C.). In the temperature range between 0° C. and the freezing point (for NTO −11° C.), inert gases dissolved in the hypergolic propellant are removed, while scarcely any of the hypergolic propellant itself is removed.

In the case of NTO, which has a boiling point of approx. 21° C. and which therefore normally has to be cooled slightly to be present in liquid form, cooling to the freezing point at −11.2° C. causes a drop in the sublimation pressure, so that the cooled NTO is not removed, while residual gases can be removed from the solid structure.

In the method for degassing hypergolic propellants, the hypergolic propellant can be cooled to the freezing point of the hypergolic propellant, the pressure that is reduced as compared to the atmospheric pressure can be applied before reaching the freezing point, and the reduced pressure as compared to the atmospheric pressure can be maintained at least temporarily during the cooling of the hypergolic propellant to freezing point. The reduced pressure as compared to the atmospheric pressure is preferably maintained until the freezing point is reached.

In the method for degassing hypergolic propellants, the hypergolic propellant is preferably moved mechanically during the cooling step and the vacuum step. The step in which the vacuum-tight vessel containing hypergolic propellant is cooled is understood as the cooling step, the step in which a pressure that is reduced as compared to the atmospheric pressure is applied to the hypergolic propellant is understood as the vacuum step. The mechanical movement is preferably caused by a shaking apparatus, such as e.g. a shaking table. The device can be shaken by this shaking apparatus during the entire process, which aids degassing or desaturation. The separation of gas and liquid hypergolic propellant is aided by constant mechanical movement of the liquid during the cooling and vacuum process. The mechanical movement takes place preferably by placing the device on a vibrating table, which preferably shakes at a frequency of 5 to 100 Hz, 10 to 50 Hz or 20 to 30 Hz.

In the method for degassing hypergolic propellants, the vacuum-tight vessel can be closed tightly by valves.

During the method for degassing hypergolic propellants, the temperature can be detected by a temperature sensor.

Due to the strong cooling of the propellants and the fall in vapour pressure or sublimation pressure associated with this, the required vacuum capacity is relatively low. A negative pressure or a vacuum of 1 to 100 mbar, preferably from 1 to 50 mbar, preferably from 1 to 20 mbar, more preferably from 1 to 10 mbar and most preferably from 1 to 2 mbar is therefore preferably applied to the hypergolic propellant.

In the method for degassing hypergolic propellants, after cooling and the application of reduced pressure as compared to the atmospheric pressure, the hypergolic propellant can be allowed to thaw while the reduced pressure is maintained, i.e. allowed to thaw after the cooling step and the vacuum step while maintaining the reduced pressure as compared to atmospheric pressure. The thawed propellant must be stored free of pressurisation in suitable, vacuum-tight vessels. The vacuum-tight vessel is closed tight e.g. by means of valves preferably before the thawing step. The vacuum-tight vessel put under reduced pressure is then allowed to thaw, wherein no fresh negative pressure is applied via a negative pressure source.

Alternatively the hypergolic propellant can be put under reduced pressure as compared to atmospheric pressure again during the thawing step upon reaching freezing point. However, preferably immediately after reaching a temperature above the freezing point, i.e. as soon as the hypergolic propellant is liquid again, the reduced pressure as compared to atmospheric pressure is turned off again. In the case of UDMH, reduced pressure as compared to atmospheric pressure would accordingly be applied afresh at a temperature from freezing point at approximately −60° C. to approximately −50° C. In the case of NTO, reduced pressure as compared to atmospheric pressure would accordingly be applied afresh at a temperature from freezing point at approximately −15° C. to approximately −10° C. This additional vacuum step (i.e. step in which a pressure that is reduced as compared to the atmospheric pressure is applied afresh) can be used if the inert gas concentration in the hypergolic propellant is to be reduced further. However, it has turned out in practice that the method described above, in which reduced pressure as compared to atmospheric pressure is applied during the cooling, is already sufficient for most applications.

The method for degassing hypergolic propellants can accordingly comprise the following steps:

introduction of hypergolic propellant into a vacuum-tight vessel, cooling of the vacuum-tight vessel containing the hypergolic propellant with dry ice during mechanical movement, application of a reduced pressure as compared to the atmospheric pressure to the hypergolic propellant while the hypergolic propellant is still liquid, further cooling of the liquid hypergolic propellant to the freezing point of the hypergolic propellant while the reduced pressure as compared to atmospheric pressure is maintained, thawing of the frozen solid hypergolic propellant by allowing it to stand in the vessel, wherein the reduced pressure as compared to atmospheric pressure is maintained, on reaching freezing point once more, optionally renewed application of reduced pressure as compared to atmospheric pressure.

Degassed Hypergolic Propellant

A degassed hypergolic propellant is substantially free of dissolved inert gases. As described above, substantially free means that the hypergolic propellant preferably contains 0 to 100 mg/l, more preferably 0 to 50 mg/l, even more preferably 0 to 10 mg/l and most preferably 0 to 5 mg/l of inert gas.

Such a degassed hypergolic propellant can be produced using a device described above or a method described above.

A vacuum-tight vessel contains a hypergolic propellant, which is substantially free of dissolved inert gases. A vacuum-tight vessel contains a hypergolic propellant, which was produced using a method as described above or a device as described above. As described above, substantially free means that the hypergolic propellant preferably contains 0 to 100 mg/l, more preferably 0 to 50 mg/l, even more preferably 0 to 10 mg/l and most preferably 0 to 5 mg/l of inert gas. Only the liquid phase and the vapour phase of the hypergolic propellant is therefore located in the vessel without inert gases still being contained therein.

BRIEF DESCRIPTION OF THE DRAWINGS

Preferred embodiments of the application are explained in greater detail below with reference to the enclosed schematic drawing, wherein FIG. 1 shows a schematic view of a device for degassing hypergolic propellants.

DETAILED DESCRIPTION OF THE DRAWINGS

A device shown in FIG. 1 for degassing hypergolic propellants comprises a vacuum-tight vessel 2, an inlet line 4 for introducing hypergolic propellant 6 into the vacuum-tight vessel 2, a tempering unit 8 for cooling the vacuum-tight vessel 2 containing the hypergolic propellant and a negative pressure source 12, which is connected to the vacuum-tight vessel 2 via an outlet line 10 and is configured to generate a pressure that is reduced as compared to the atmospheric pressure in the vacuum-tight vessel 2.

The hypergolic propellant can be selected from at least one of 1,1-dimethylhydrazine, monomethylhydrazine, hydrazine and nitrogen tetroxide. The hypergolic propellant can contain a gas, which comprises at least helium, nitrogen or argon.

The vacuum-tight vessel 2 is provided with an inlet line 4 and an outlet line 10. The vacuum-tight vessel can be filled with hypergolic propellant 6 via the inlet line 4. The hypergolic propellant should be present in liquid form in this case, i.e. in the case of nitrogen tetroxide this must be cooled if necessary before filling. The vacuum-tight vessel 2 with the hypergolic propellant 6 is cooled by a tempering unit 8.

The tempering unit 8 preferably comprises a cooling vessel, via which the vacuum-tight vessel 2 is cooled. The cooling vessel is preferably filled with dry ice, so that the vacuum-tight vessel 2 is cooled to a temperature of approx. −78° C. When the hypergolic propellant is cooled down using dry ice, the substance-specific freezing temperatures can be reached easily. Dry ice also has a high thermal/refrigeration capacity, which is beneficial for the economy and efficiency of the method using the device. Furthermore, the method is virtually location-independent, as the device can be constructed in principle anywhere that the handling of hypergolic propellants is permitted.

During the process as a whole, care should be taken that the hypergolic propellant 6 does not come into contact with air or oxygen, but is always handled in an inert gas atmosphere or in a vacuum. The pressure in the vessel corresponds to that of the vapour pressure of the liquid at the corresponding temperature. Since this is normally below the ambient air pressure (approx. 1 bar), the vessel should have a high pressure resistance and a high vacuum tightness, in order to guarantee a long storage time of e.g. 1 year. This applies in particular to the storage of NTO, which can assume vapour pressures of between 200 mbar and several bar depending on temperature.

As soon as the hypergolic propellant has been cooled, but before its freezing point is reached, where it is present in solid form, negative pressure can be applied to the hypergolic propellant via a negative pressure source connected to the outlet line 10. The negative pressure source is preferably a vacuum pump, such as, in particular, a chemically compatible membrane vacuum pump. Due to the strong cooling of the propellants and the fall in vapour pressure or sublimation pressure associated with this, the required vacuum capacity is relatively low. The negative pressure source is therefore preferably configured to remove inert gases from hypergolic propellants. The negative pressure source is therefore preferably configured to apply a vacuum of 1 to 100 mbar, preferably of 1 to 50 mbar, preferably of 1 to 20 mbar, more preferably of 1 to 10 mbar and most preferably of 1 to 2 mbar to the hypergolic propellant.

The device for degassing hypergolic propellants preferably comprises a shaking apparatus 14 for the mechanical movement of the vacuum-tight vessel 2. The device can be shaken by this shaking apparatus during the entire process, which aids the degassing or desaturation. The separation of gas and liquid hypergolic propellant is assisted by constant mechanical movement of the liquid during the cooling and vacuum process. The mechanical movement is preferably achieved by placing the device on a vibrating table, which preferably shakes at a frequency of 5 to 100 Hz, 10 to 50 Hz or 20 to 30 Hz.

The device for degassing hypergolic propellants can further comprise valves 16, 18 arranged on the inlet line 4 and the outlet line 10 for tight closure of the vacuum-tight vessel 2. The valves 16, 18 facilitate the controlled supply of hypergolic propellant, the removal of inert gases, and the tight closure of the vacuum-tight vessel 2 following the procedure.

The device for degassing hypergolic propellants can further comprise a temperature sensor, which is arranged in the vacuum-tight vessel 2. The temperature in the vacuum-tight vessel 2 can be monitored on an ongoing basis via the temperature sensor. The vacuum can thereby be applied at the desired time, which is preferably selected as described above.

EXAMPLE 1

Method for Cleaning of 1,1-dimethylhydrazine (UDMH)

A high-grade steel vessel as shown in FIG. 1, provided with suitable valves and connections, was provided.

The high-grade steel vessel was tested without propellant to ensure that it withstands the temperatures (of down to below −60° C.) and pressures (of down to below 2 mbar) used in the method and remains tight in relation to the outside atmosphere in these conditions. The high-grade steel vessel was designed so that it can be used directly for fuelling. The temperature in the high-grade steel vessel can be measured by a temperature sensor, which was arranged in a steel pipe filled with IPA (isopropanol).

Approximately 400 kg of UDMH was put into the high-grade steel vessel. The filled high-grade steel vessel was cooled slowly from room temperature for approx. 1 day using dry ice with shaking by means of a vibrating table at a frequency of 20 to 30 Hz. On reaching approx. 0° C., a vacuum of approx. 1-2 mbar was applied by a membrane pump designed according to explosion protection requirements (e.g. by Vacuubrand).

The vacuum was only applied upon reaching approx. 0° C., as here the vapour pressure of UDMH is lowered and in order thus to keep losses of UDMH low. Due to this, gases dissolved in the UDMH (in particular helium and nitrogen) were drawn out of the UDMH and the UDMH was desaturated.

Upon reaching the freezing point of UDMH at approx. −58° C., waiting ensued until the UDMH was frozen. Then the high-grade steel vessel was closed tightly, the vacuum pump turned off and the high-grade steel vessel allowed to stand for a period of approx. 8-10 h (dependent on the quantity of liquid).

The shaking aids the separation of gas and liquid and ensures that seed crystals disintegrate and the UDMH freezes amorphously. The amorphous freezing prevents gases from being trapped in the otherwise crystalline structure.

The high-grade steel vessel was allowed to thaw slowly by way of ambient temperature, wherein on reaching the freezing point (at approx. −60° C. to −55° C.), a vacuum was applied afresh. As soon as the UDMH was liquid again, the high-grade steel vessel was closed tightly and the vacuum maintained. This step is optional, as the first degassing step already brings about the desired desaturation, but was executed in the experiments to ensure a complete desaturation of UDMH.

Then the high-grade steel vessel was closed tightly, the vacuum pump shut down and the high-grade steel vessel allowed to thaw completely with retention of the vacuum. The thawing can take several days, as it is preferably not heated, but is warmed up by way of the ambient temperature.

It was determined that a small quantity of the UDMH (approx. 1-2 kg) was lost in the process.

The process can be repeated several times to achieve the required residual gas proportion, which has not, however, proved to be necessary in practice.

Following completed degassing, the gas content is measured by a method reciprocal to the degassing, wherein a defined quantity (approx. 150 ml) of a pure liquid sample of the degassed propellant is removed, frozen and the escaping residual gas is determined volumetrically.

EXAMPLE 2

Method for Degassing Nitrogen Tetroxide (NTO)

The method described in example 1 was executed analogously with NTO, wherein 700 kg of NTO was used. Since the freezing point of NTO is at approx. −11.2° C., the vacuum was applied accordingly. In the case of the optional degassing step on thawing, vacuum was therefore applied afresh only upon reaching the freezing point (at approx. −15° C. to −10° C.).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for the degassing of hypergolic propellants, comprising:
    introducing hypergolic propellant into a vacuum-tight vessel;
    cooling the vacuum-tight vessel containing the hypergolic propellant, thereby cooling the hypergolic propellant;
    applying a pressure that is reduced as compared to the atmospheric pressure to the hypergolic propellant before the temperature of the hypergolic propellant reaches the freezing point; and
    maintaining the pressure that is reduced as compared to the atmospheric pressure at least temporarily while further cooling the hypergolic propellant to the hypergolic propellant freezing point.

2. The method according to claim 1, wherein
    the hypergolic propellant includes at least a component selected from the group consisting of 1,1-dimethylhydrazine, monomethylhydrazine, hydrazine and nitrogen tetroxide, and the hypergolic propellant contains a gas, which comprises at least helium, nitrogen or argon.

3. The method according to claim 1, wherein the hypergolic propellant is moved mechanically while cooling the vacuum-tight vessel and reducing the pressure as compared to the atmospheric pressure.

4. The method according to claim 1, wherein the pressure that is reduced as compared to the atmospheric pressure is a vacuum of 1 to 100 mbar applied to the hypergolic propellant.

5. The method according to claim 1, wherein
    following cooling and the application of a pressure that is reduced as compared to the atmospheric pressure, the method further comprises thawing the hypergolic propellant while the reduced pressure is maintained.

6. A degassed hypergolic propellant produced by the method according to claim 1.

7. A vacuum-tight vessel containing the degassed hypergolic propellant according to claim 6.

* * * * *